United States Patent
Li et al.

(10) Patent No.: US 11,434,313 B2
(45) Date of Patent: Sep. 6, 2022

(54) CURABLE COMPOSITION FOR MAKING CURED LAYER WITH HIGH THERMAL STABILITY

(71) Applicant: CANON KABUSHIKI KAISHA, Tokyo (JP)

(72) Inventors: Fei Li, Austin, TX (US); Timothy Brian Stachowiak, Austin, TX (US); Fen Wan, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/124,063

(22) Filed: Dec. 16, 2020

(65) Prior Publication Data

US 2022/0185915 A1 Jun. 16, 2022

(51) Int. Cl.
| | |
|---|---|
| *C08F 2/46* | (2006.01) |
| *C08F 2/50* | (2006.01) |
| *C08G 61/04* | (2006.01) |
| *C08F 22/40* | (2006.01) |
| *B05D 3/06* | (2006.01) |
| *C08F 212/08* | (2006.01) |
| *B32B 27/28* | (2006.01) |
| *B32B 27/34* | (2006.01) |
| *C08F 20/58* | (2006.01) |
| *B32B 27/26* | (2006.01) |

(52) U.S. Cl.
CPC .............. *C08F 2/50* (2013.01); *B05D 3/067* (2013.01); *B32B 27/26* (2013.01); *B32B 27/281* (2013.01); *B32B 27/34* (2013.01); *C08F 20/58* (2013.01); *C08F 22/40* (2013.01); *C08F 212/08* (2013.01); *C08F 2800/20* (2013.01)

(58) Field of Classification Search
CPC ............... C08F 2/46; C08F 2/50; C08G 61/04
USPC ............................................ 522/5, 1; 520/1
See application file for complete search history.

(56) References Cited

U.S. PATENT DOCUMENTS

| | | | |
|---|---|---|---|
| 5,274,059 A | 12/1993 | Kato et al. | |
| 5,536,791 A * | 7/1996 | Schink | C08G 73/12 524/538 |
| 7,884,174 B2 * | 2/2011 | Mizori | C08L 79/085 528/310 |
| 2004/0198859 A1 * | 10/2004 | Nguyen | C08F 2/50 522/26 |
| 2014/0050900 A1 | 2/2014 | Kodama et al. | |
| 2020/0166844 A1 | 5/2020 | Okada et al. | |
| 2020/0018140 A1 | 6/2020 | Shur-Fen | |
| 2020/0308230 A1 | 10/2020 | Blackwell | |
| 2020/0339828 A1 | 10/2020 | Li | |
| 2021/0070906 A1 * | 3/2021 | Li | C08F 224/00 |

FOREIGN PATENT DOCUMENTS

| | | | | |
|---|---|---|---|---|
| EP | 2423276 A1 | 2/2012 | | |
| WO | WO-9939247 A1 * | 8/1999 | | G03F 7/031 |
| WO | WO-2011010461 A1 * | 1/2011 | | C08K 5/0008 |
| WO | 20130096523 A1 | 6/2013 | | |
| WO | WO-2020153246 A1 * | 7/2020 | | C08K 5/09 |

OTHER PUBLICATIONS

Minegishi et al, WO 2011/010461 Machine Translation, Jan. 27, 2011 (Year: 2011).*
Kumazawa et al, WO 2020153246 Machine Translation, Jul. 30, 2020 (Year: 2020).*

* cited by examiner

*Primary Examiner* — Jessica Whiteley
(74) *Attorney, Agent, or Firm* — Abel Schillinger, LLP

(57) ABSTRACT

A curable composition can comprise a polymerizable material and a photo-initiator, wherein the polymerizable material can comprise a first monomer including at least one bismaleimide-monomer and at least one second monomer. The curable composition can have a viscosity of not greater than 30 mPa·s, and a cured layer of the curable composition can have a high thermal stability up to 350° C.

19 Claims, 2 Drawing Sheets

CURABLE COMPOSITION FOR MAKING CURED LAYER WITH HIGH THERMAL STABILITY

FIELD OF THE DISCLOSURE

The present disclosure relates to a curable composition, particularly to a curable composition for inkjet adaptive planarization including a bismaleimide monomer, wherein a cured layer made from the curable composition can have a high thermal stability of up to 350° C.

BACKGROUND

Inkjet Adaptive Planarization (IAP) is a process which planarizes a surface of a substrate, e.g., a wafer containing an electronic circuit, by jetting liquid drops of a curable composition on the surface of the substrate, and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps. There exists a need for improved IAP materials leading to planar cured layers with high thermal stability.

SUMMARY

In one embodiment, a curable composition can comprise a polymerizable material and a photo-initiator, wherein the polymerizable material can comprise a first monomer including at least one bismaleimide-monomer and at least one second monomer; an amount of the at least one bismaleimide-monomer can be at least 5 wt % and not greater than 60 wt % based on the total weight of the polymerizable material; a viscosity of the curable composition at 23° C. can be not greater than 30 mPa·s; and a cured layer of the curable composition after being subjected to a baking treatment at 350° C. for 30 minutes under nitrogen can have a weight loss during a reheating under nitrogen from 25° C. to 350° C. at a rate of 20° C./min of not greater than 2%.

In one aspect, the amount of the at least one bismaleimide-monomer can be not greater than 30 wt % based on the total weight of the polymerizable monomer. In another aspect, the amount of the at least one bismaleimide-monomer can be not greater than 15 wt %.

In one embodiment of the curable composition, the at least one second monomer can include at least one acrylate monomer, divinylbenzene (DVB), trivinylbenzene, N-vinylpyrrolidone (NVP), acryloylmorpholine (AMP), or any combination thereof.

In one aspect of the curable composition, the at least one acrylate monomer can include at least one multi-functional acrylate monomer.

In another aspect of the curable composition, the at least one second monomer can comprise DVB and at least one multi-functional acrylate monomer.

In yet a further aspect, the acrylate monomer can comprise a mono-functional acrylate monomer, wherein an amount of the mono-functional acrylate monomer may be not greater than 20 wt % based on the total weight of the polymerizable material.

In one embodiment of the curable composition, the at least one bismaleimide monomer can include 4,4'-bismaleimidodiphenylmethane; bis(3-ethyl-5-methyl-4-maleimidophenyl) methane; 2,2-bis[4-(4-maleimidophenoxy)phenyl]propane or any combination thereof.

In one aspect, the bismaleimide monomer can be dissolved within the at least one second monomer.

In a further aspect, the curable composition can be essentially free of a solvent.

In a certain aspect, the bismaleimide monomer can be a solid at room temperature and may be dissolved in N-vinylpyrrolidone (NVP) or acryloylmorpholine (AMP).

In yet another certain aspect, the bismaleimide monomer can be a fluid at room temperature and the at least one second monomer can comprise DVB, or a multi-functional acrylate monomer, or a combination thereof.

In another embodiment, a laminate can comprise a substrate and a cured layer overlying the substrate, wherein the cured layer may be formed from the above-described curable composition.

In a certain embodiment of the laminate, the weight loss of the cured layer after the baking treatment and during reheating from 25° C. to 350° C. under nitrogen at a rate of 20° C./minute can be not greater than 1.5%.

In a further embodiment, a method of forming a cured layer on a substrate can comprise: applying a layer of a curable composition on the substrate, wherein the curable composition comprises a polymerizable material and a photoinitiator, the polymerizable material comprising a first monomer including at least one bismaleimide-monomer and a second monomer, wherein an amount of the at least one bismaleimide-monomer can be at least 5 wt % and not greater than 60 wt % based on the total weight of the polymerizable material; bringing the curable composition into contact with a superstrate; irradiating the curable composition with light to form a cured layer; and removing the superstrate from the cured layer, wherein the cured layer after being after being subjected to a baking treatment at 350° C. for 30 minutes under nitrogen has a weight loss during a reheating under nitrogen from 25° C. to 350° C. at a rate of 20° C./min of not greater than 2%.

In one aspect of the method, the viscosity of the curable composition at 23° C. may be not greater than 30 mPa·s.

In another aspect of the method, the at least one second monomer of the curable composition can include at least one acrylate monomer, divinylbenzene (DVB), trivinylbenzene (TVB), N-vinyl-pyrrolidone (NVP), acryloylmorpholine (AMP), or any combination thereof.

In a certain aspect of the method, the at least one acrylate monomer can comprise at least one multi-functional acrylate monomer.

In another particular aspect of the method, the at least one bismaleimide monomer of the curable composition can include 4,4'-bismaleimidodiphenylmethane; bis(3-ethyl-5-methyl-4-maleimidophenyl)methane; 2,2-bis[4-(4-maleimidophenoxy)phenyl]propane or any combination thereof.

In yet a further embodiment, a method of manufacturing an article can comprise: applying a layer of a curable composition on a substrate, wherein the curable composition can comprise a polymerizable material and a photoinitiator, the polymerizable material comprising a first monomer including at least one bismaleimide-monomer and a second monomer, wherein an amount of the at least one bismaleimide-monomer can be at least 5 wt % and not greater than 60 wt % based on the total weight of the polymerizable material; bringing the curable composition into contact with a superstrate; irradiating the curable composition with light to form a cured layer; removing the superstrate from the cured layer, wherein the cured layer after being subjected to a baking treatment at 350° C. for 30 minutes under nitrogen can have a weight loss during a reheating under nitrogen from 25° C. to 350° C. at a rate of 20° C./min of not greater than 2%; forming a pattern on the substrate; processing the substrate on which the pattern has been formed in the forming; and manufacturing an article from the substrate processed in the processing.

BRIEF DESCRIPTION OF THE DRAWINGS

Embodiments are illustrated by way of example and are not limited in the accompanying figure.

Figure 1:
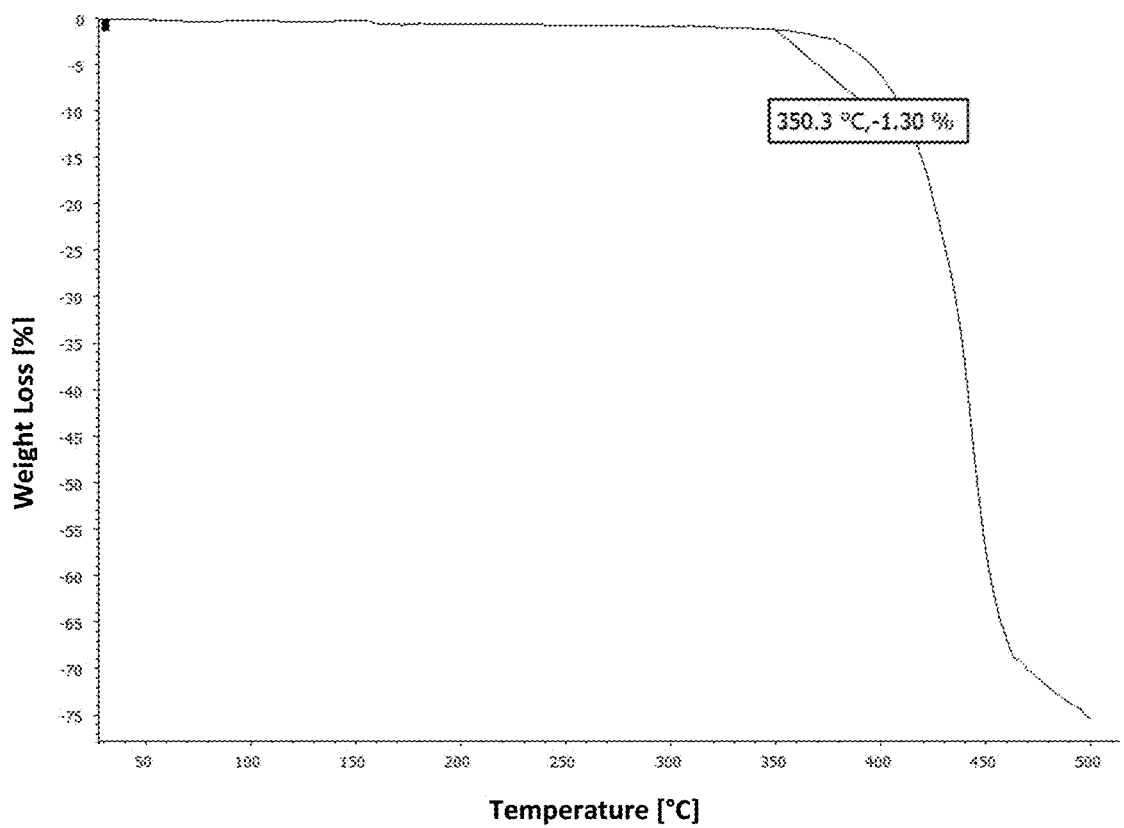
FIG. 1 includes a graph illustrating the weight loss of a cured layer via thermographic analysis (TGA) at a rate of 20° C./minute according to one embodiment, wherein the TGA was conducted after a baking treatment of the cured layers at 350° C. for 30 minutes under nitrogen.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a curable composition comprising a polymerizable material and a photoinitiator, wherein the polymerizable material can comprise a first monomer including at least one bismaleimide-monomer and at least one second monomer. It has been surprisingly observed that curable compositions including certain combinations of at least one bismaleimide monomer and at least one second monomer can produce cured layers having a high heat stability up to 350° C. In one aspect, a cured layer can be formed from the curable composition, wherein the cured layer, after being subjected to a baking treatment at 350° C. for 30 minutes under nitrogen, can have a weight loss during a reheating under nitrogen from 25° C. to 350° C. at a rate of 20° C./min of not greater than 2%.

As used herein, the term "bismaleimide monomer" relates to monomers comprising two maleimide rings. In one embodiment, the bismaleimide monomer can be an N-substituted monomer having the general structure of Formula 1, wherein R can include one or more substituted or unsubstituted benzyl rings or a substituted or unsubstituted cyclohexane ring, or alkyl, or alkylaryl.

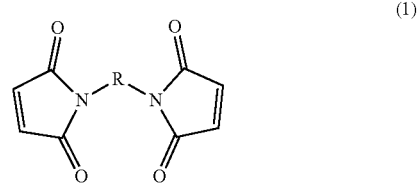

(1)

Non-limiting examples of bismaleimide monomers contained in the curable composition of the present disclosure can be 4,4'-bismaleimidodiphenylmethane (BMDM)—CAS 13676-54-5; bis(3-ethyl-5-methyl-4-maleimidophenyl) methane (BEMMA)—CAS 105391-33-1); 2,2-bis[4-(4-maleimidophenoxy)phenyl]propane (BMAPP)—CAS 79922-55-7; 1H-pyrrole-2,5-dione,1,1'-C36-alkylenebis (BMI-689)—CAS 1911605-95-2; 3-methyl 1,5-pentanediol diacrylate (MDPA) CAS 64194-22-5; 1-maleimido-5-maleimidomethyl-3,3,5-trimethylcyclohexane (BMI-A)—CAS 128762-04-9; 1,3-bis(maleimidomethyl)cyclohexane (BMI-B)—CAS 197096-63-2; 1,1'-[(Octahydro-4,7-methano-1H-indene-2,5-diyl)bis(methylene)]bis[1H-pyrrole-2,5-dione] (BMI-C)—CAS 1360462-58-3; 1,1'-[Methylenebis(2-methyl-4,1-cyclohexanediyl)]bis[1H-pyrrole-2,5-dione] (BMI-D)—CAS 943149-44-8; or any combination thereof.

BMAPP:

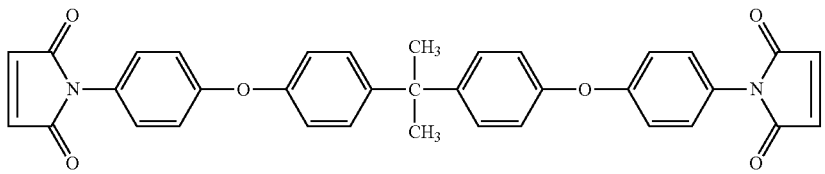 [SMILES: CC(C)(c1ccc(Oc2ccc(N3C(=O)C=CC3=O)cc2)cc1)c1ccc(Oc2ccc(N3C(=O)C=CC3=O)cc2)cc1]

BMI-689:

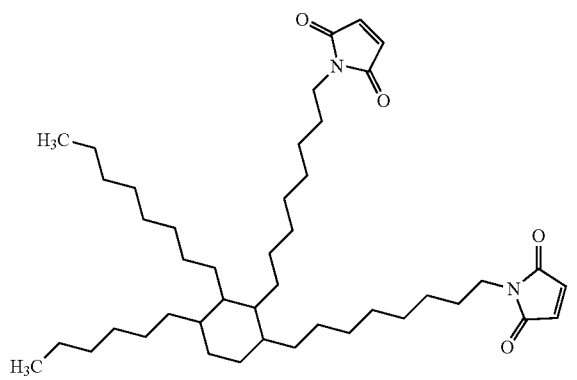 [SMILES: CCCCCCCCC1C(CCCCCC)CCC(CCCCCCCCN2C(=O)C=CC2=O)C1CCCCCCCCN1C(=O)C=CC1=O]

BMDM:

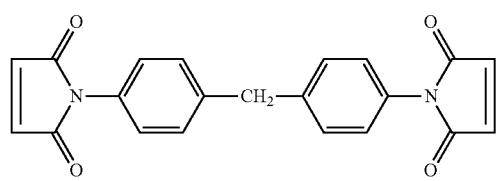 [SMILES: O=C1C=CC(=O)N1c1ccc(Cc2ccc(N3C(=O)C=CC3=O)cc2)cc1]

BEMMA:

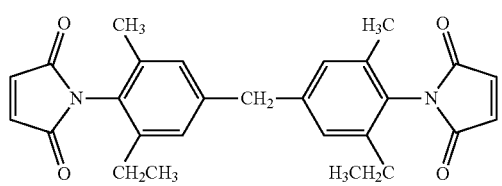

MDPA:

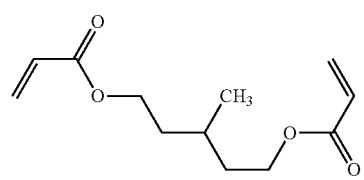 [SMILES: C=CC(=O)OCCC(C)CCOC(=O)C=C]

BMI-A:

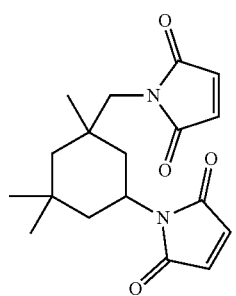 [SMILES: CC1(C)CC(N2C(=O)C=CC2=O)CC(C)(CN2C(=O)C=CC2=O)C1]

BMI-B:

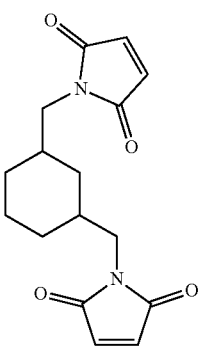 [SMILES: O=C1C=CC(=O)N1CC1CCCC(CN2C(=O)C=CC2=O)C1]

BMI-C:

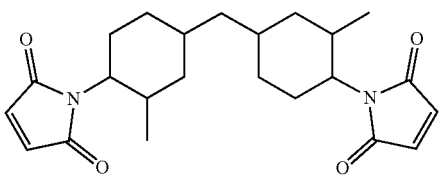 [SMILES: CC1CC(CC2CCC(N3C(=O)C=CC3=O)C(C)C2)CCC1N1C(=O)C=CC1=O]

BMI-D:

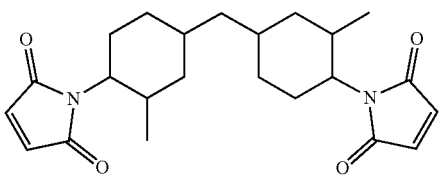 [SMILES: CC1CC(CC2CCC(N3C(=O)C=CC3=O)C(C)C2)CCC1N1C(=O)C=CC1=O]

In a certain embodiments of the curable composition, the amount of the bismaleimide monomer can be not greater than 60 wt % based on the total weight of the curable composition, such as not greater than 50 wt %, or not greater than 40 wt %, or not greater than 30 wt %, or not greater than 20 wt %, or not greater than 15 wt %, or not greater than 10 wt %. In another aspect, the amount of the bismaleimide monomer may be at least 5 wt % based on the total weight of the curable composition, or at least 10 wt %, or at least 15 wt %, or at least 20 wt % based on the total weight of the polymerizable material. The amount of the bismaleimide monomer can be a value within a range of any of thee maximum and minimum values noted above while maintaining a high thermal stability.

In one embodiment, the at least one second monomer can be at least one multi-functional monomer or a combination of at least one multi-functional monomer and at least one mono-functional monomer. As used herein, the term "multi-functional" or "mono-functional" relates to the amount of functional groups in a monomer which can participate in the polymerization or cross-linking reactions of the polymerizable material during curing. Non-limiting examples of functional groups can be vinyl-groups, hydroxyl groups, carboxyl groups, amine-groups, or isocyanate groups. In a certain particular aspect, each of the monomers of the polymerizable material can include one or more vinyl groups.

Non-limiting examples of the at least one second monomer can be acrylate monomers, styrene, divinylbenzene, trivinylbenzene, N-vinylpyrrolidone (NVP), acryloylmorpholine (AMP) or any combination thereof.

In a particular aspect, the at least one acrylate monomer can include at least one multi-functional acrylate monomer, for example a bi-functional, a tri-functional, or a tetra-functional acrylate monomer. Furthermore, as used herein, the term acrylate monomer relates to substituted and non-substituted acrylate monomers. Non-limiting examples of substituted acrylate monomers can be an alkylacrylate, for example, methacrylate or ethylacrylate.

In a certain particular aspect, the at least one second monomer of the curable composition can include a multi-functional acrylate monomer and divinylbenzene.

In another certain aspect, the at least one second monomer can include a mono-functional acrylate monomer, wherein the amount of the mono-functional acrylate monomer may be not greater than 20 wt % based on the total weight of the polymerizable material, such as not greater than 15 wt %, or not greater than 10 wt %.

In a certain embodiment, the polymerizable material of the curable composition can be free of a solvent and may consist essentially of the at least one bismaleimide monomer and the at least one second monomer.

In a certain embodiment, the bismaleimide monomer can be a compound which is solid at room temperature (23° C.) and may be dissolved in another monomer of the polymerizable material, which is part of the at least one second monomer. In a certain particular aspect, the bismaleimide monomer can be 2,2-bis[4-(4-maleimidophenoxy)phenyl]propane (BMAPP) and may be dissolved in N-vinylpyrrolidone (NVP) or acryloylmorpholine (AMP).

In another aspect, the bismaleimide monomer may be fluid at room temperature and can be miscible with the other monomers of the composition. In a certain particular aspect, the bismaleimide monomer can be 1H-pyrrole-2,5-dione, 1,1'-C36-alkylenebis (BMI-689), and the second monomer can comprise DVB, or a multi-functional acrylate monomer, or a combination thereof.

In a particular embodiment, the at least one second monomer can include divinylbenzene and at least one multi-functional monomer.

In another particular embodiment, the at least one second monomer can comprise a mono-acrylate, wherein the amount of the mono-acrylate may be not greater than 20 wt % based on the total weight of the polymerizable material. In a certain aspect the amount of the mono-acrylate may be at least 5 wt % and not greater than 15 wt %, or not greater than 10 wt %, or not greater than 7 wt %.

In a certain embodiment, a weight percent ratio of the bismaleimide monomer to the at least one second monomer in the photocurable composition can be from 1:10 to 10:1, or from 1:10 to 1:2, or from 1:10 to 1:5.

In another aspect, the polymerizable material of the photocurable composition can further include to a certain amount polymerizable monomers, oligomers, or polymers.

In one embodiment, the curable composition of the present disclosure can have a low viscosity which may allow the use of these compositions in IAP applications. In one aspect, the viscosity of the curable composition at a temperature of 23° C. can be not greater than 50 mPa·s, such as not greater than 40 mPa·s, or not greater than 30 mPa·s, not greater than 20 mPa·s, not greater than 15 mPa·s, or not greater than 10 mPa·s. In another aspect, the viscosity may be at least 2 mPa·s, or at least 5 mPa·s, or at least 7 mPa·s. As used herein, all viscosity values relate to viscosities measured at a given temperature with the Brookfield method.

In yet a further embodiment, the amount of polymerizable material contained in the curable composition can be at least 75 wt % based on the total weight of the photocurable composition, such as at least 80 wt %, at least 85 wt %, at least 90 wt %, or at least 95 wt %. In another aspect, the amount of polymerizable material may be not greater than 99.5 wt %, such as not greater than 99 wt %, or not greater than 98 wt %, or not greater than 97 wt %, or not greater than 95 wt %, or not greater than 93 wt %, or not greater than 90 wt %. The amount of polymerizable material can be within a range of any of the minimum and maximum values noted above. In a particular aspect, the amount of polymerizable material can be at least 85 wt % and not greater than 98 wt %, or at least 90 wt % and not greater than 97 wt % based on the total weight of the photocurable composition.

In a further aspect, the curable composition of the present disclosure may be free of a solvent.

In order to initiate the photocuring of the composition if exposed to light, one or more photoinitiators can be included in the photocurable composition.

In a certain aspect, the curing can be also conducted without the presence of a photo-initiator. In another certain aspect, the curing can be conducted by a combination of light and heat curing.

In a further aspect, the curable composition can contain at least one optional additive. Non-limiting examples of optional additives can be surfactants, dispersants, stabilizer, co-solvents, initiators, inhibitors, dyes, or any combination thereof.

In another embodiment, the present disclosure is directed to a laminate comprising a substrate and a cured layer overlying the substrate, wherein the cured layer can be formed from the curable composition described above.

In a certain aspect, the laminate can further include one or more layers between the substrate and the cured layer, for example an adhesion layer.

The present disclosure is further directed to a method of forming a cured layer. The method can comprise applying the curable composition described above on a substrate; bringing the curable composition into contact with a superstrate; irradiating the photocurable composition with light to form the cured layer; and removing the superstrate from the cured layer.

In one aspect, the light irradiation can be conducted with light having wavelength between 250 nm to 760 nm. In a preferred aspect, the light irradiation may be conducted with light having a wavelength between 300 nm and 450 nm.

The substrate and the solidified (cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that curable composition comprising a bismaleimide monomer in combination with certain multi-functional monomers and/or combinations of multi-functional monomers and mono-functional monomers can have very suitable properties for IAP processing. The curable composition may have a low viscosity and can form cured layers having an exceptionally high thermal stability up to 350° C.

EXAMPLES

The following non-limiting examples illustrate the concepts as described herein.

Example 1

Preparing of Photocurable IAP Compositions

Photocurable compositions were prepared including the following bismaleimide monomers: A) 2,2-Bis[4-(4-maleimidophenoxy)phenyl]propane (CAS No.: 79922-55-7), herein also called "BMAPP", which is solid at room temperature (23° C.); and B) 1H-Pyrrole-2,5-dione,1,1'-C36-alkylenebis (CAS 1911605-95-2), herein also called "BMI-689", which is liquid at room temperature.

Curable Compositions Including BMAPP:

To dissolve the solid BMAPP, two polymerizable monomers were found to be suitable: N-vinylpyrrolidone (NVP) and acryloylmorpholine (AMP). Curable compositions S1 to S4 were prepared, wherein compositions S1 and S2 contained NVP as solvent, and compositions S3 and S4 included AMP as solvent. In addition, the following monomers were used in varying combinations: a tetra-functional acrylate monomer, herein also called "SR295" (pentaerythritol tetraacrylate from Sartomer); a tri-functional acrylate monomer, herein also called SR351 (Trimethylolpropane triacrylate from Sartomer), a di-functional acrylate monomer, herein also called "MPDA" (3-methyl 1,5-pentanediol diacrylate from Sartomer), and divinylbenzene (DVB). All photocurable compositions further contained as photoinitiator 1-5 wt % Irgacure 819 and 0.1%-3% of a surfactant. A summary of the prepared curable compositions S1 to S4, showing the type and amounts of the used monomers and the viscosities of the final curable compositions can be seen in Table 1.

Curable Compositions Including BMI689

Curable compositions S5 and S6 were prepared including the liquid bismaleimide monomer BMI689. In composition S5, the BMI689 was combined with DVB, and in composition S6, BMI689 was combined with neopentyl glycol diacrylate, herein also called "SR241" (from Sartomer), see also Table 1.

Comparative Curable Composition

A comparative curable composition was prepared using a mono-maleimide monomer instead of a bismaleimide monomer. As mono-maleimide monomer was used N-benzyl maleimide (CAS 1632-26-1) (BMI) in combination with NVP and the tetra-functional acrylate monomer SR295. The exact composition of the polymerizable material is also shown in Table 1. Similarly as in the other curable compositions, the comparative composition C1 also included as photoinitiator Irgacure 819 and the same surfactant.

Viscosities

The viscosities of the photocurable compositions were measured using a Brookfield Viscometer LVDV-II+Pro at 200 rpm, with a spindle size #18 and a spin speed of 135 rpm. For the viscosity testing, about 6-7 mL of sample liquid was added into the sample chamber, enough to cover the spindle head. The sample contained in the chamber was about 20 minutes equilibrated to reach the desired measuring temperature of 23° C. before the actual measurement was started. For all viscosity testing, at least three measurements were conducted and an average value was calculated.

Thermal Stability of Photo-Cured Layers

Photo-cured layers of all the compositions listed in Table 1 were made by applying a 300 microns thick layer of the curable composition on a glass substrate and curing the film at room temperature (23° C.) with UV light having its maximum wave length peak at 365 nm and a light intensity of 20 mW/cm$^2$ for 120 seconds, which corresponds to a curing energy dosage of 2.4 J/cm$^2$.

The solid photo-cured layers were further subjected to the following heat treatments:

1) Placing the photo-cured layer on a 350° C. heated hotplate for 30 minutes under nitrogen, also called herein "baking." After 30 minutes baking at 350° C., the layer was removed from the hotplate and allowed to cool down to room temperature, and the weight loss was measured before and after the baking treatment.

2) Thereafter a sample of 25 mg was taken from the baked film and a TGA measurement using a was conducted using a Linseis STA PT 1000 instrument by reheating the sample from 25° C. to about 500° C. at a rate of 20° C./minute under nitrogen, until the sample was completely degraded.

The weight loss during the baking was between about 10 to 17 wt % for Samples S1 to S4, and between 1 to 3 wt % for Samples S5 and S6. After the baking, the layers had an excellent thermal stability up to 350° C. The exact weight loss of the baked layers during reheating from 25° C. to 350° C. at a rate of 20° C./minute can be seen in Table 2.

TABLE 2

| Sample | Weight loss during reheating from 25° C.-350° C. [%] |
|---|---|
| S1 | NA |
| S2 | 1.30 |

TABLE 1

| Sample | BMAPP | BMI689 | NVP | AMP | MPDA (A2) | SR247 (A2) | SR351 (A3) | SR295 (A4) | BMI | DVB | Visc. [mPa · s] |
|---|---|---|---|---|---|---|---|---|---|---|---|
| S1 | 23 | | 76 | | | | | | | | 8.53 |
| S2 | 20 | | 70 | | | | | 10 | | | 12.5 |
| S3 | 10 | | | 40 | 20 | | 20 | | | 10 | 20.3 |
| S4 | 10 | | | 40 | 25 | | 10 | | | 10 | 13.0 |
| S5 | | 50 | | | | | | | | 50 | 15.3 |
| S6 | | 25 | | | | 75 | | | | | 19.8 |
| C-1 | | | 70 | | | | | 10 | 20 | | 5.42 |

TABLE 2-continued

| Sample | Weight loss during reheating from 25° C.-350° C. [%] |
|---|---|
| S3 | 1.53 |
| S4 | 1.15 |
| S5 | 1.09 |
| S6 | 0.96 |
| C1 | 17.02 |

Figure 2:
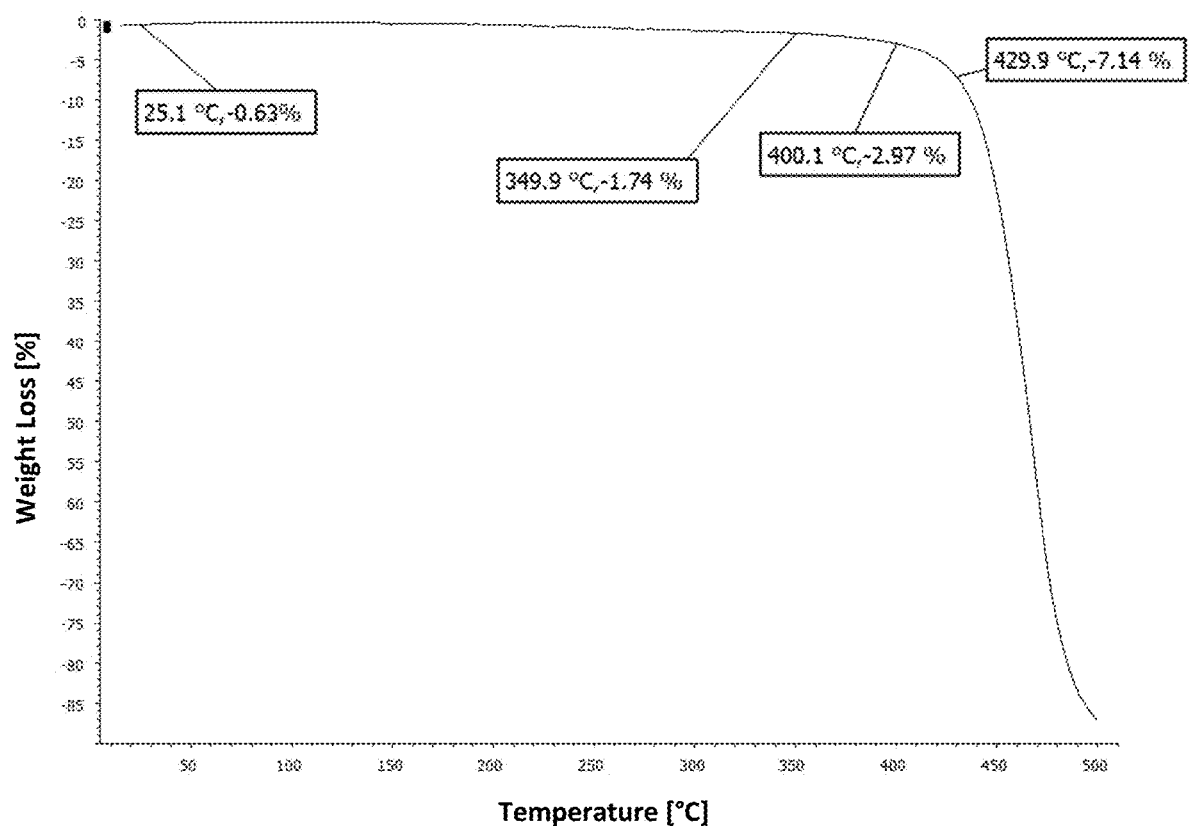
FIG. 2 includes a graph illustrating the weight loss of a cured layer via thermographic analysis (TGA) at a rate of 20° C./minute according to one embodiment, wherein the TGA was conducted after a baking treatment of the cured layers at 350° C. for 30 minutes under nitrogen.

The experiments showed that photo-cured layers from samples S1 to S6 can be subjected to a baking treatment at 350° C. for 30 minutes without damaging the layers. Reheating the baked layers after cooling from 25° C. to 350° C. showed that these materials had an excellent heat stability up to a temperature of 350° C. with a weight loss of only between 0.96 to 1.53 percent based on the total weight of the layer before the reheating. The TGA curve during reheating of samples S2 is shown in FIG. 1, and the TGA curve of samples S5 is shown in FIG. 2. Such high thermal stability of the cured layers, combined with a low viscosity of the respective curable compositions can make these materials very suitable for AIP processing.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A curable composition, comprising a polymerizable material and a photoinitiator, wherein
   the polymerizable material comprising a first monomer including at least one bismaleimide-monomer and at least one second monomer, wherein the bismaleimide monomer is dissolved within the second monomer;
   an amount of the at least one bismaleimide-monomer is at least 5 wt % and not greater than 60 wt % based on the total weight of the polymerizable material;
   a viscosity of the curable composition at 23° C. is not greater than 30 mPa·s; and
   a cured layer of the curable composition after being subjected to a baking treatment at 350° C. for 30 minutes under nitrogen has a weight loss during a reheating under nitrogen from 25° C. to 350° C. at a rate of 20° C./min of not greater than 2%.

2. The curable composition of claim 1, wherein the amount of the at least one bismaleimide-monomer is at least 5 wt % and not greater than 30 wt %.

3. The curable composition of claim 2, wherein the amount of the bismaleimide-monomer is at least 5 wt % and not greater than 15 wt %.

4. The curable composition of claim 1, wherein the at least one second monomer includes at least one acrylate monomer, divinylbenzene (DVB), N-vinylpyrrolidone (NVP), acryloylmorpholine (AMP), or any combination thereof.

5. The curable composition of claim 4, wherein the at least one acrylate monomer includes at least one multi-functional acrylate monomer (MFA).

6. The curable composition of claim 4, wherein the second monomer comprises DVB and at least one multi-functional acrylate monomer.

7. The curable composition of claim 4, wherein the acrylate monomer comprises a mono-functional acrylate monomer, wherein an amount of the mono-functional acrylate monomer is not greater than 20 wt % based on the total weight of the polymerizable material.

8. The curable composition of claim 1, wherein the at least one bismaleimide monomer includes 4,4'-bismaleimidodiphenylmethane; bis(3-ethyl-5-methyl-4-maleimidophenyl)methane; 2,2-bis[4-(4-maleimidophenoxy)phenyl]propane or any combination thereof.

9. The curable composition of claim 1, wherein the curable composition is essentially free of a solvent.

10. The curable composition of claim 1, wherein the bismaleimide monomer is a solid at room temperature and dissolved in N-vinylpyrrolidone (NVP) or acryloylmorpholine (AMP).

11. The curable composition of claim 1, wherein the bismaleimide monomer is a fluid at room temperature and the second monomer comprises DVB, or a multi-functional acrylate monomer, or a combination thereof.

12. A laminate comprising a substrate and a cured layer overlying the substrate, wherein the cured layer is formed from the curable composition of claim 1.

13. The laminate of claim 12, wherein the weight loss of the cured layer during the reheating from 25° C. to 350° C. under nitrogen at a speed of 20° C./minute is not greater than 1.5%.

14. A method of forming a cured layer on a substrate, comprising:
   applying a layer of a curable composition on the substrate, wherein the curable composition comprises a polymerizable material and a photoinitiator, the polymerizable material comprising a first monomer including at least one bismaleimide-monomer and a second monomer, wherein the bismaleimide monomer is dissolved within the second monomer and an amount of the at least one bismaleimide-monomer is at least 5 wt % and not greater than 60 wt % based on the total weight of the polymerizable material;
   bringing the curable composition into contact with a superstrate;
   irradiating the curable composition with light to form a cured layer; and
   removing the superstrate from the cured layer,
   wherein the cured layer after being after being subjected to a baking treatment at 350° C. for 30 minutes under nitrogen has a weight loss during a reheating under nitrogen from 25° C. to 350° C. at a rate of 20° C./min of not greater than 2%.

15. The method of claim 14, wherein a viscosity of the curable composition at 23° C. is not greater than 30 mPa·s.

16. The method of claim 14, wherein the second monomer includes at least one acrylate monomer, divinylbenzene (DVB), trivinylbenzene (TVB, N-vinylpyrrolidone (NVP), acryloylmorpholine (AMP), or any combination thereof.

17. The method of claim 16, wherein the acrylate monomer comprises at least one multi-functional acrylate monomer.

18. The method of claim 14, wherein the at least one bismaleimide monomer includes 4,4'-bismaleimidodiphenylmethane; bis(3-ethyl-5-methyl-4-maleimidophenyl)methane; 2,2-bis[4-(4-maleimidophenoxy)phenyl]propane or any combination thereof.

19. A method of manufacturing an article, comprising:

applying a layer of a curable composition on a substrate, wherein the curable composition comprises a polymerizable material and a photoinitiator, the polymerizable material comprising a first monomer including at least one bismaleimide-monomer and a second monomer, wherein the bismaleimide monomer is dissolved within the second monomer and an amount of the at least one bismaleimide-monomer is at least 5 wt % and not greater than 60 wt % based on the total weight of the polymerizable material;

bringing the curable composition into contact with a superstrate;

irradiating the curable composition with light to form a cured layer;

removing the superstrate from the cured layer, wherein the cured layer after being subjected to a baking treatment at 350° C. for 30 minutes under nitrogen has a weight loss during a reheating under nitrogen from 25° C. to 350° C. at a rate of 20° C./min of not greater than 2%;

forming a pattern on the substrate;

processing the substrate on which the pattern has been formed in the forming; and manufacturing an article from the substrate processed in the processing.

* * * * *